Aug. 30, 1960   D. E. GERBERICH   2,950,808
MATERIAL HANDLING APPARATUS
Filed Dec. 1, 1958
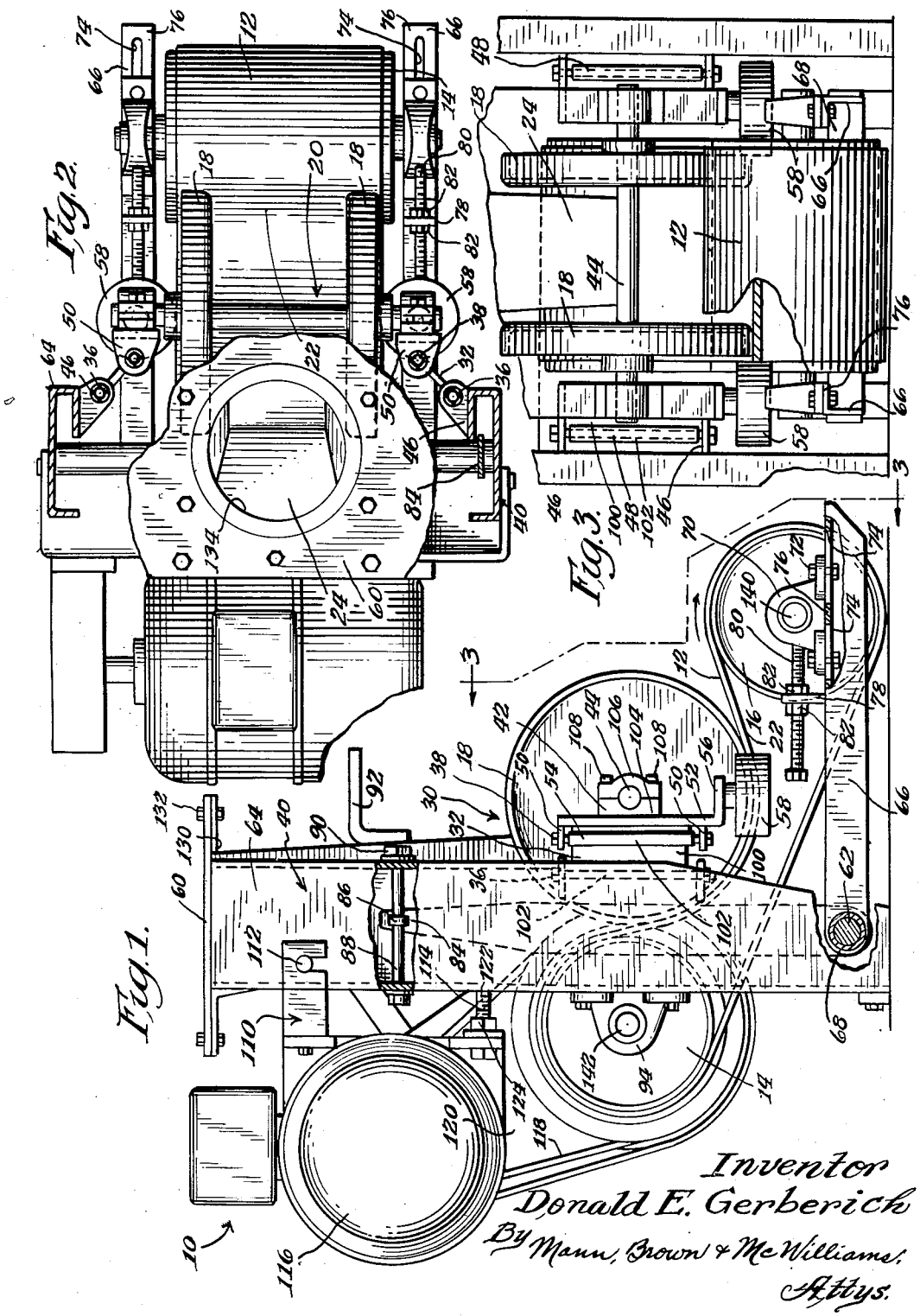
Inventor
Donald E. Gerberich
By Mann, Brown & McWilliams,
Attys.

United States Patent Office 2,950,808
Patented Aug. 30, 1960

2,950,808

MATERIAL HANDLING APPARATUS

Donald E. Gerberich, Aurora, Ill., assignor to Stephens-Adamson Mfg. Co., a corporation of Illinois Filed Dec. 1, 1958, Ser. No. 777,420

3 Claims. (Cl. 198—128)

My invention relates to thrower apparatus of the type disclosed in Patent No. 2,467,634, granted to Alfred D. Sinden, for loading or piling loose bulk material ranging from finely divided pulverant material to coarse material, such as coal. More particularly, my invention relates to a self-training device for the conveyor component of such apparatus to keep said conveyor from drifting sidewise on its pulleys.

Thrower apparatus of the type disclosed in the above mentioned patent comprises an endless conveyor trained over spaced pulleys, a pair of spaced discs secured to a common shaft between said pulleys, with the discs being pressed against the upper surface of the upper run of the conveyor to form the conveyor into a material receiving pocket with an inclined throwing surface. The apparatus includes a hopper which directs the material flow between said discs and into said pocket. One of the pulleys is driven by a suitable source of power and this effects a throwing action on the material supplied to the hopper.

A common cause of damage to endless conveyors of the type employed in the above described floor apparatus, as well as to endless conveyors in general, is the tendency of the conveyors, which ordinarily comprise belts formed from rubber or rubber-like materials, to drift or move sidewise of their pulleys with consequent rubbing or snagging of the belt on chutes, framing, and the like.

One way of preventing drift or sidewise movement of the belts is to employ crowned pulleys. However, experience has shown that crowned pulleys are not completely effective in preventing drift and are objectionable since they put undesirable strains on the belt carcass in addition to those resulting from driving tension and flexing. Rubber belt manufacturers discourage use of crowns on pulleys when a belt is to be stressed near its rating.

Self-training belt supporting idler rollers along the straight run of the belt have also been employed to aid in preventing this objectionable sidewise movement, but since the training force they exert on the belt is limited to the weight of the belt and its load, if any, times the coefficient of friction between the belt and the idler, these idler rolls may frequently fail to hold the conveyors of this type in line.

Copending application of Alfred D. Sinden, Serial No. 500,563, filed April 11, 1955, now abandoned, discloses an improved conveyor training device of the type to which my invention relates, which insures a maximum positive training pressure on the conveyor by employing the tension of the conveyor belt to aid in the training action.

A principal object of my invention is to provide an improved training device for thrower apparatus which retains the principle of employing the belt tension to aid in the training action.

A further principal object of the invention is to provide a self-training device for conveyors, which is particularly adapted for use in connection with thrower apparatus of the type described in said Patent No. 2,467,634, and which is composed of few and inexpensively manufactured components.

A more general object of the invention is to provide improved thrower apparatus of the type described in said patent.

Other objects, uses and advantages will be obvious or become apparent from a consideration of the following detailed description and the application drawing.

In the drawing:

Figure 1 is a side elevational view of one form of thrower apparatus to which the principles of my invention have been applied, parts being broken away to facilitate illustration;

Figure 2 is a plan view of the apparatus shown in Figure 1, parts being broken away and shown in section to facilitate illustration; and Figure 3 is an elevational view of the apparatus shown in Figure 1 taken along line 3—3 of Figure 1.

*General description*

Reference numeral 10 of Figure 1 generally indicates thrower apparatus of the type described in the above mentioned patent, but which has been modified in accordance with the principles of my invention. The apparatus 10 generally comprises an endless conveyor in the form of a short high speed belt 12 trained over spaced end pulleys 14 and 16, one of which is driven in any suitable manner to move the conveyor in the direction of the arrow of Figure 1. The outer surface of the upper run of the conveyor 12 is engaged by spaced discs 18, which are pressed against the belt to form the belt into a material receiving pocket 20 (see Figure 2) with an inclined throwing surface 22.

During operation of the apparatus 10, the belt 12 is actuated to move at high speed in the direction of the arrow of Figure 1, and bulk material is delivered to chute or spout 24 from which it passes into the belt pocket 20 formed by discs 18 in the rapidly moving belt. The bulk material meets the belt while travelling in substantially the same direction as the belt which maintains the original momentum of the bulk material, and as the bulk material travels around the concave portion of the belt, it quickly attains belt speed. The centrifugal force of the material against the belt causes the material to attain a linear velocity equal to the belt velocity, and this causes the material to be thrown away from the thrower apparatus in a continuous stream for a substantial distance, the dimension of which will depend upon the material and the manner of feeding the thrower.

A more specific description of the throwing action on the material may be obtained by referring to the above mentioned patent, as well as earlier granted Patent No. 1,597,393, though it may be mentioned that apparatus of this type is widely employed to load and trim boxcars and storage bins, or pile the material where desired.

In accordance with my invention, the two discs or wheels 18, which in effect form pulley means, are arranged to provide a training action on the belt 12. The discs or wheels 18 form a part of self-training device 30, which also includes a pair of arms or links 32 pivoted by pins 36 and 38 to the apparatus frame 40 and bearing structures 42, the latter journalling shaft 44 to which the discs are keyed.

The pins 36 extend through lugs 46 secured to the apparatus frame and sleeve portion 48 of the respective arms or links 32. The pins 38 extend through lugs 50 that are fixed to a bar 52 which is in turn made fast to the respective bearing structures 42; pins 38 also extend through sleeve portion 54 of the respective arms or links 32.

The respective bars 52 include an angled portion 56 which rotatably mounts a roller 58 that is positioned to engage the edge of the conveyor belt (see Figure 3).

The bearing structures 42 are only diagrammatically illustrated but may be of any suitable type. They need not be self-aligning and plane bearings will serve the purpose.

It will be observed in Figure 2 that the arms or links 32, the shaft 44, and the apparatus frame 40 form a trapezoidal linkage arrangement. Also, the arms or links 32 are mounted at their tubular ends for pivotal movement about parallel axes that extend perpendicular to the axis of rotation of shaft 44. The arms or links 32 are coplanar in the sense that they act in the same plane; shaft 44 lies in the plane in which the arms or links 32 act.

During operation of the apparatus 10, if belt 12 should drift to the right of Figure 3, the right hand roller 58 is moved by the belt 12 to the right of Figure 3. Since the right hand roller 58 is connected to the right hand bearing structure 42 and the bearing structures 42 are pivotally connected to the frame 40 through arms or links 32, the shaft 44 will shift to the right of Figure 3, but will simultaneously tend to swing or swivel clockwise, as viewed in Figure 2. This will dispose the discs 18 in a position to steer the belt to the left of Figure 3, since the pulley means comprising the shaft 44 and discs 18 will then be somewhat out of alignment with the pulleys 14 and 16. The then inclined pulley means places a substantial sidewise force on the belt that counteracts drift of the belt and restores it to its normal operating position.

On drift in the opposite direction, the self-training action of the pulley means formed by the discs 18 and shaft 44 is the same but operates in a reverse manner.

In actual practice, the movement of the various components of training device 30 is barely perceptible, since a tendency to drift immediately brings into play the operation of the device 30, thus instantaneously applying a force to the belt that is designated to overcome the tendency to drift.

*Specific description*

The frame 40 of apparatus 10 comprises a top plate 60, a bottom rod 62 and spaced channel members 64, all united in any suitable manner to form a strong unitary structure. At the lower portion of the apparatus, angle members 66 are fixed at their inner ends to sleeve or tube 68 which is received over rod 62. Angle members 66 carry bearing units 70 which journal pulley 16, the bearing units 70 being mounted in place by suitable bolts 72 extending through elongate holes 74 formed in the horizontal flanges 76 of members 66. Angle members 66 each fixedly carry an upright member 78 that screw threadedly receives threaded rod 80, one end of which bears against the adjacent bearing unit 70. Suitable lock nuts 82 hold the rod 80 in adjusted position. Adjustment of the tension in belt 12 may be achieved by loosening bolts 72 and actuating rod 80 to move pulley 16 as desired, after which bolts 72 are retightened.

On one side of frame 40, upright arm 84 is welded to tube or sleeve 68. Arm 84 carries a tapped lug 86 (see Figure 1) which receives bolt 88 that is journalled in the side frame member 64 in any suitable manner. The head 90 of bolt 88 carries crank handle 92 for rotating the bolt 88, whereby the arm 84 swings to vary the elevation of pulley 16 and thus vary the angle of throw of the thrower.

The side frame members 64 have secured thereto a pair of pillow block bearing units 94 which journal pulley 14.

The lugs 46 of training device 30 may be fixed to the respective frame members 64 in any suitable manner, as by welding. The pins 36 and 38 may take the form of bolts of appropriate length. The arms or links 32 each comprise a plate 100 having tubes 102 welded to each end thereof. The tubes 102 form the sleeves 48 and 54 through which the respective pins 36 and 38 pass.

The bars 52 are each in the form of an L-shaped structure to which the anti-friction roller 58 is rotatably mounted in any suitable manner. The bearing structure 42 as illustrated, comprises a base portion 104 fixed to the adjacent bar 52 in any suitable manner, and a cap portion 106 that is drawn against the shaft by appropriate bolts 108. If desired, a suitable self-aligning ball bearing structure may be substituted for the bearing structure 42, but this is not essential to the efficient operation of the device 30.

The apparatus frame 40 carries a suitable motor support structure generally indicated at 110 pivoted as by pins 112 on each side of the apparatus and provided with adjustable stops 114 at each side of the apparatus. The motor support structure 110 carries an appropriate power unit 116, such as a gasoline engine, which drives pulley 14 through an appropriate pulley belt or chain 118 engaging conventional sheaves or sprockets. A guard 120 is fixed to the frame 40 in any suitable manner to cover the pulley belt or chain 118.

The adjustable stop 114, which comprises a screw threaded stud 122 and lock nut 124, is adjusted to adjust the tension on the pulley belt or chain 118.

The hopper 24 includes a flange 130 that is secured to the under surface of frame plate 60, as by appropriate bolts 132.

In use, the apparatus illustrated is associated with, for instance, car loading apparatus of the type contemplated by the above mentioned Patent No. 2,467,634. During operation of the apparatus, bulk material is supplied to hopper 24 through opening 134, the hopper guiding the bulk material into pocket 20 of the thrower.

*Distinguishing features and advantages of the invention*

It will be noted that the discs 18 of the apparatus 10 engage the conveyor 12 with substantial wrap, which is to be distinguished from the engagement of an idler merely supporting, for instance, either the upper or lower runs of the conveyor. The term "substantial wrap" as employed in the specification and claims, means that amount of wrap of the conveyor about the pulley means employed which would cause more pressure between the conveyor and the pulley means than would be caused by the weight of the conveyor and its load alone. The drawing illustrations all show substantial wrap within the meaning of this definition.

The discs 18 and shaft 44 in effect form bend pulley means. Since the pressure applied to the discs by the belt necessarily results, to a large extent, from the belt tension applied to the belt by the discs, it will be appreciated that the steering effect of such a pulley means is much more positive than it could be from an ordinary idler pulley that merely supports the conveyor. Moreover, since the rate of sidewise movement of the conveyor is proportional to the deflection of the bend pulley means shaft, the training action provided by the swivelling action of such a pulley means is much more positive than any practical crown on a terminal pulley 14 or 16 could be.

The angle that the arms or links 32 converge to may be varied between relatively wide limits, though the preferred angulation is susbtantially that employed in the drawings.

Preferably, the high speed shafts 140 and 142 of pulleys 14 and 16 are journalled in self-aligning ball bearing units of the type made and sold under the trademark "Sealmaster" by Stephens-Adamson Mfg. Co. of Aurora, Illinois.

The foregoing description and the drawing are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A conveyor belt aligning device comprising pulley means mounted on a swinging support and engaging said conveyor belt with substantial wrap, said support comprising a pair of coplanar arms mounted at like ends for pivotal movement about axes that are parallel to each other, said arms being connected to said pulley means at the other ends thereof for pivotal movement about axes that are parallel to the first mentioned axes and extend substantially normally of the axis of rotation of said pulley means, said arms converging in the direction of said pulley means, said support including means on each side thereof between which said conveyor belt is trained and which is adapted to be engaged by the conveyor belt on drift thereof to swing said pulley means to a position that opposes drift.

2. Thrower apparatus comprising frame means, a pair of spaced apart pulleys journalled on said frame means, an endless conveyor trained over said pulleys, a pair of discs spaced apart laterally of the conveyor and engaging the upper run of the conveyor with substantial wrap to form the conveyor into a material receiving pocket with an inclined throwing surface, a chute leading into said pocket, said discs being secured to a common shaft, said shaft being secured between a pair of coplanar spaced apart arms that converge in the direction of said shaft, said arms being secured between said shaft and said frame means at their respective ends for pivotal movement about parallel axes that extend normally of the axis of rotation of said discs, and means connected to each of said arms for engagement by the conveyor on drift thereof.

3. Thrower apparatus comprising frame means, a pair of spaced apart pulleys journalled on said frame means, an endless conveyor trained over said pulleys, a pair of discs spaced apart laterally of the conveyor and engaging the upper run of the conveyor with substantial wrap to form the conveyor into a material receiving pocket with an inclined throwing surface, a chute leading into said pocket, said discs being secured to a shaft, said shaft being secured between a pair of spaced apart coplanar arms that act in a plane which includes the axis of said shaft, said arms converging in the direction of said shaft, means for securing each arm between the shaft and said frame means adjacent the respective ends of said arms for pivotal movement about parallel axes that extend normally of the axis of said shaft, and roller means carried at each end of the shaft for engagement by the conveyor on drift thereof, whereby said shaft and said arms form a trapezoidal linkage during normal operation of the conveyor, but on drift of the conveyor, one of said roller means is engaged by the conveyor to position said shaft and said discs to oppose drift.

References Cited in the file of this patent

UNITED STATES PATENTS

| 1,785,402 | Arentzen | Dec. 16, 1930 |
| 2,467,634 | Sinden | Apr. 19, 1949 |

FOREIGN PATENTS

| 599,474 | Germany | July 3, 1934 |